United States Patent
Matsumiya et al.

(10) Patent No.: US 9,494,848 B2
(45) Date of Patent: Nov. 15, 2016

(54) PROJECTOR

(71) Applicant: Seiko Epson Corporation, Tokyo (JP)

(72) Inventors: Toshio Matsumiya, Matsumoto (JP); Nobuyuki Otsuki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 117 days.

(21) Appl. No.: 14/159,131

(22) Filed: Jan. 20, 2014

(65) Prior Publication Data

US 2014/0204348 A1  Jul. 24, 2014

(30) Foreign Application Priority Data

Jan. 22, 2013  (JP) ................................. 2013-009021

(51) Int. Cl.
*G03B 21/16* (2006.01)
*H04N 9/31* (2006.01)

(52) U.S. Cl.
CPC ............ *G03B 21/16* (2013.01); *H04N 9/3144* (2013.01)

(58) Field of Classification Search
CPC ..... G03B 21/16; G03G 21/206; H01J 61/84; H01J 61/86; H04N 9/3144
USPC ............................ 353/52, 57, 61, 119, 58, 60
See application file for complete search history.

(56) References Cited

U.S. PATENT DOCUMENTS

| | | | |
|---|---|---|---|
| 6,793,343 B2 * | 9/2004 | Nakano et al. | 353/61 |
| 6,957,892 B2 * | 10/2005 | Kuroda | 353/61 |
| 7,631,973 B2 | 12/2009 | Matsumiya et al. | |
| 2003/0137640 A1 * | 7/2003 | Nakano et al. | 353/57 |
| 2004/0080719 A1 * | 4/2004 | Morinaga | 353/61 |
| 2005/0001988 A1 * | 1/2005 | Sample | G03B 21/16 353/52 |
| 2006/0290894 A1 * | 12/2006 | Asada | 353/58 |

FOREIGN PATENT DOCUMENTS

| | | |
|---|---|---|
| JP | 2002-365728 A | 12/2002 |
| JP | 2007-057996 A | 3/2007 |
| JP | 4635784 B | 2/2011 |

* cited by examiner

*Primary Examiner* — Bao-Luan Le
*Assistant Examiner* — Christopher Lamb, II
(74) *Attorney, Agent, or Firm* — ALG Intellectual Property, LLC (57) ABSTRACT

A projector includes: an external housing that includes a projection opening and an exhaust port arranged on the same side as the projection opening; an axial-flow fan that causes air to flow therein with the rotation of blades and delivers the air flowing therein; and a plurality of slats that are arranged at the exhaust port and guide the air delivered from the axial-flow fan to an outside. The plurality of slats include an elongated slat that is disposed in, among four exhaust areas arranged side by side in the exhaust port, one of the two exhaust areas on the side close to the projection opening and whose length in a direction in which the air is guided corresponding to a rotational direction of the blade is longer than that of the slats disposed in the other areas.

7 Claims, 5 Drawing Sheets

PROJECTOR

BACKGROUND

1. Technical Field

The present invention relates to a projector

2. Related Art

Heretofore, projectors including a light modulating device that modulates a luminous flux emitted from a light source and a projection lens that projects the modulated luminous flux have been known. The temperature in the projector rises due to heat generated by the light emission of the light source, which deteriorates the performance or function of internal components. Therefore, the projector adopts a cooling structure that discharges warmed inside air to the outside with a fan. In projectors in which an exhaust port through which the inside air is discharged is disposed on the same side as a projection direction, a projector has been proposed in which, for preventing the occurrence of distortion (heat-haze phenomenon) in a projection image, the warmed air discharged through the exhaust port is guided such that the air does not enter into a passing area of the luminous flux projected through the projection lens (for example, refer to JP-A-2002-365728 (Patent Document 1)).

The projector disclosed in Patent Document 1 includes an external case having an exhaust port, a safety cover (louver) having a plurality of slats, and an axial-flow exhaust fan. The safety cover is arranged at the exhaust port. The plurality of slats are inclined from the inside to the outside of the external case in a direction away from the projection lens side.

The air warmed by cooling the light source and the like is sucked by the axial-flow exhaust fan, guided by the plurality of slats, and discharged in the direction away from the projection lens side.

In the louver disclosed in Patent Document 1, however, the slats are not formed corresponding to the blowing performance of the axial-flow exhaust fan. Therefore, the slats serve as resistances of the flow of air, so that the warmed air inside the external housing may not be efficiently discharged. Moreover, when the drive voltage of the axial-flow exhaust fan is increased to discharge the warmed air inside the external housing, there arises a problem that noises of the projector are increased.

SUMMARY

An advantage of some aspects of the invention is to solve at least a part of the problems described above, and the invention can be implemented as the following modes or application examples.

APPLICATION EXAMPLE 1

This application example 1 is directed to a projector that modulates, according to image information, a luminous flux emitted from a light source, and projects the modulated luminous flux through a projection lens, including: an external housing that accommodates the light source and the projection lens, and includes a projection opening through which the luminous flux projected through the projection lens passes, and an exhaust port arranged on the same side as the projection opening and through which inside air is discharged to an outside; an axial-flow fan that includes a rotating shaft and blades arranged around the rotating shaft, causes air to flow therein in a direction of a central axis of the rotating shaft with the rotation of the blades, and delivers the air flowing therein; and a plurality of slats that are arranged at the exhaust port to extend in a direction intersecting a first direction in which the projection opening and the exhaust port are arranged, and guide the air delivered from the axial-flow fan to the outside, wherein the plurality of slats include an elongated slat that is disposed in, among four exhaust areas arranged side by side in the first direction in the exhaust port and a second direction orthogonal to the first direction, one of the two exhaust areas on the side close to the projection opening and whose length in a direction in which the air delivered from the axial-flow fan is guided to the outside so as to correspond to a rotational direction of the blade is longer than that of the slats disposed in the other areas.

According to this configuration, the projection opening and the exhaust port are arranged on the same side of the external housing so as to be along the first direction (for example, the horizontal direction). At the exhaust port, the slats extending in a direction (for example, the vertical direction) intersecting the first direction are disposed. In one of the two exhaust areas on the side close to the projection opening among the four exhaust areas, the elongated slat whose length (guide length) in a direction in which the air is guided corresponding to the rotational direction of the axial-flow fan is longer than that of the slats disposed in the other areas is disposed.

A portion of the air delivered from the axial-flow fan hits an inner surface of a member (for example, a duct, the external housing, or the like) located on a deliver side of the axial-flow fan, and therefore changes in direction. Moreover, the direction is also changed according to the rotational direction of the blade of the axial-flow fan. Therefore, by disposing the elongated slat in the area described above, it is possible to prevent the ingress of the air discharged through the exhaust port into an area (passing area of luminous flux) where the luminous flux projected through the projection lens passes. The air discharged through the exhaust port is warmed air because the air cooled the light source and the like. Therefore, by preventing the ingress of the air into the passing area of luminous flux, it is possible to prevent a phenomenon (heat-haze phenomenon) that an image projected onto a screen or the like is distorted. Moreover, the slats other than the elongated slat are formed to have a guide length shorter than that of the elongated slat, so that the warmed inside air can be efficiently discharged to the outside.

Hence, it is possible to efficiently cool the inside of the projector and project an image in which the heat-haze phenomenon is prevented. Moreover, since efficient discharge is possible, a noise-reduction in the projector can be achieved due to the low-voltage driving of the axial-flow fan.

APPLICATION EXAMPLE 2

In the projector according to the application example, it is preferable that the elongated slat is disposed in the exhaust area that is one of the two exhaust areas on the side close to the projection opening and through which air delivered from the blade that is to rotate so as to come close to the projection opening is mainly discharged.

In the axial-flow fan, the air delivered from the blade that is to rotate so as to come close to the projection opening hits the inner surface of the member located on the deliver side of the axial-flow fan, and therefore, a travel direction of the air is likely to be changed to the projection opening side.

According to this configuration, the elongated slat is disposed in the exhaust area through which the air whose travel direction is likely to be changed to the projection opening side is mainly discharged. Therefore, it is possible to change the direction of the air that is likely to be directed to the projection opening side, and thereby efficiently prevent the ingress of the air into the passing area of luminous flux.

APPLICATION EXAMPLE 3

In the projector according to the application example, it is preferable that the elongated slat is formed so as to protrude to an inner side of the external housing with respect to the other slats.

According to this configuration, the elongated slat can be arranged at a position closer to the axial-flow fan. Therefore, it is more possible to guide the air delivered from the axial-flow fan such that the air is not directed to the projection opening side. Moreover, since the guide length can be made long without protruding the elongated slat to an outer surface side, the appearance of the projector can be improved. Therefore, it is more possible to prevent the heat-haze phenomenon while improving the design of the projector.

APPLICATION EXAMPLE 4

In the projector according to the application example, it is preferable that the axial-flow fan is arranged such that the central axis of the rotating shaft lies in the same direction as an optical axis of the projection lens.

According to this configuration, the axial-flow fan is arranged such that the delivery port through which air is delivered is in a face-to-face relationship with a surface along the projection surface of an image. With this configuration, compared to a configuration in which the delivery port is not in a face-to-face relationship with the surface along the projection surface and the axial-flow fan is obliquely arranged, the accommodating space of the axial-flow fan in the external housing can be efficiently set. Therefore, it is possible to provide the projector capable of properly cooling the inside by preventing an increase in size, and projecting an image in which the heat-haze phenomenon is prevented.

APPLICATION EXAMPLE 5

In the projector according to the application example, it is preferable that the axial-flow fan is arranged so as to face the exhaust port, and that the four exhaust areas are arranged side by side via a first imaginary line that crosses an area overlapping the rotating shaft and is orthogonal to the first direction and a second imaginary line that crosses the area overlapping the rotating shaft and is orthogonal to the second direction, as viewed from a direction in which air is delivered from the axial-flow fan.

According to this configuration, the axial-flow fan is arranged so as to face the exhaust port, and the four exhaust areas are formed as described above. Therefore, the positions for arranging the plurality of slats including the elongated slat can be easily set corresponding to the rotational direction of the blade of the axial-flow fan.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a projector according to an embodiment will be described with reference to the drawings.

The projector of the embodiment modulates, according to image information, a luminous flux emitted from a light source, and projects an image onto a projection surface such as a screen.

Main Configuration of Projector

Figure 1:
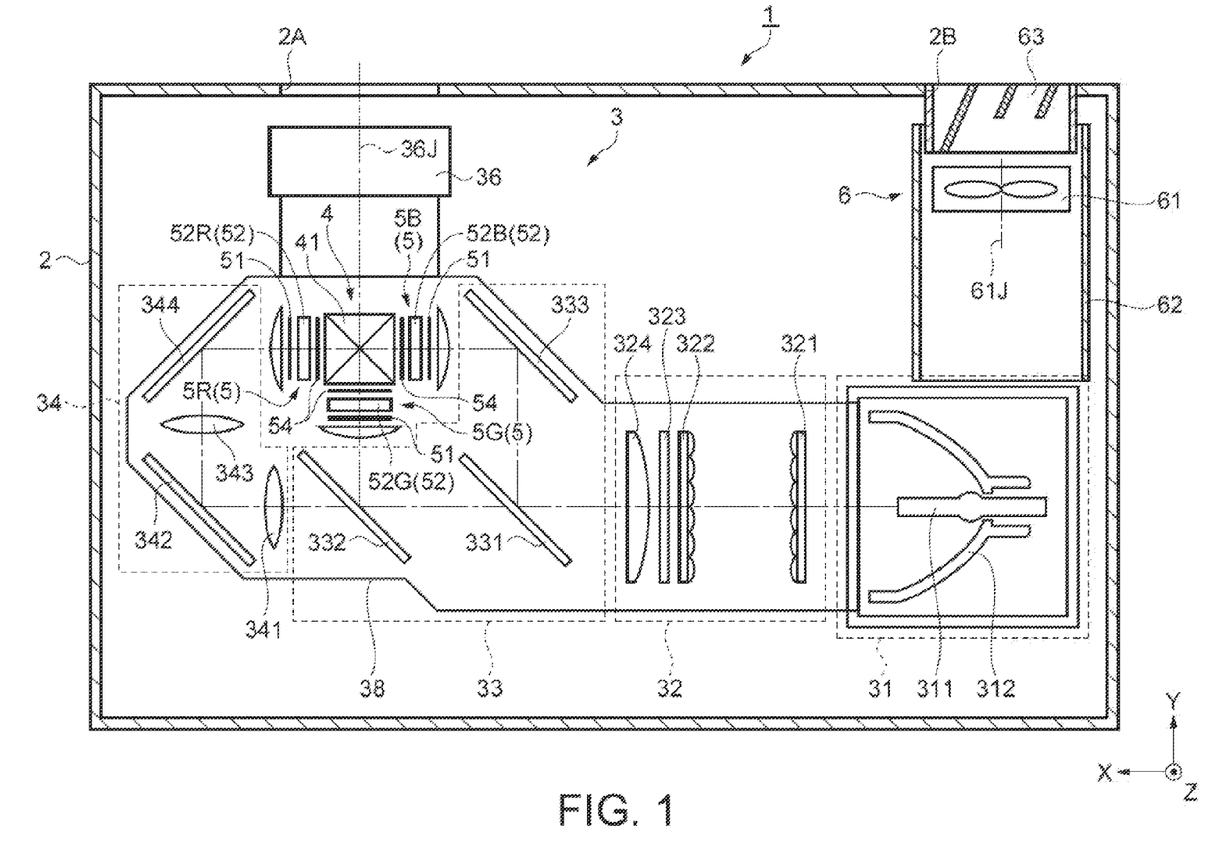
FIG. 1 is a schematic view showing a schematic configuration of a projector of an embodiment.

FIG. 1 is a schematic view showing a schematic configuration of the projector 1 of the embodiment.

As shown in FIG. 1, the projector 1 includes an external housing 2 constituting an exterior of the projector, a controller (not shown), an optical unit 3 including a light source device 31 and a projection lens 36, and a cooling device 6. The optical unit 3 is formed in a substantially L-shape in plan view. At one end of the optical unit 3, the light source device 31 is removably arranged, while the projection lens 36 is arranged at the other end. Although not shown in the drawing, a power supply device or the like that supplies power to the light source device 31 or the controller is further arranged inside the external housing 2. In the following, for convenience of description, a direction in which a luminous flux is emitted from the light source device 31 is described as a positive X direction; a direction in which a luminous flux is emitted through the projection lens 36 is described as a positive Y direction (front side); and an upper direction in the posture of the projector 1 placed on a desk or the like is described as a positive Z direction (upper side). Moreover, positive and negative X directions are defined as a left-and-right direction.

Figure 2:
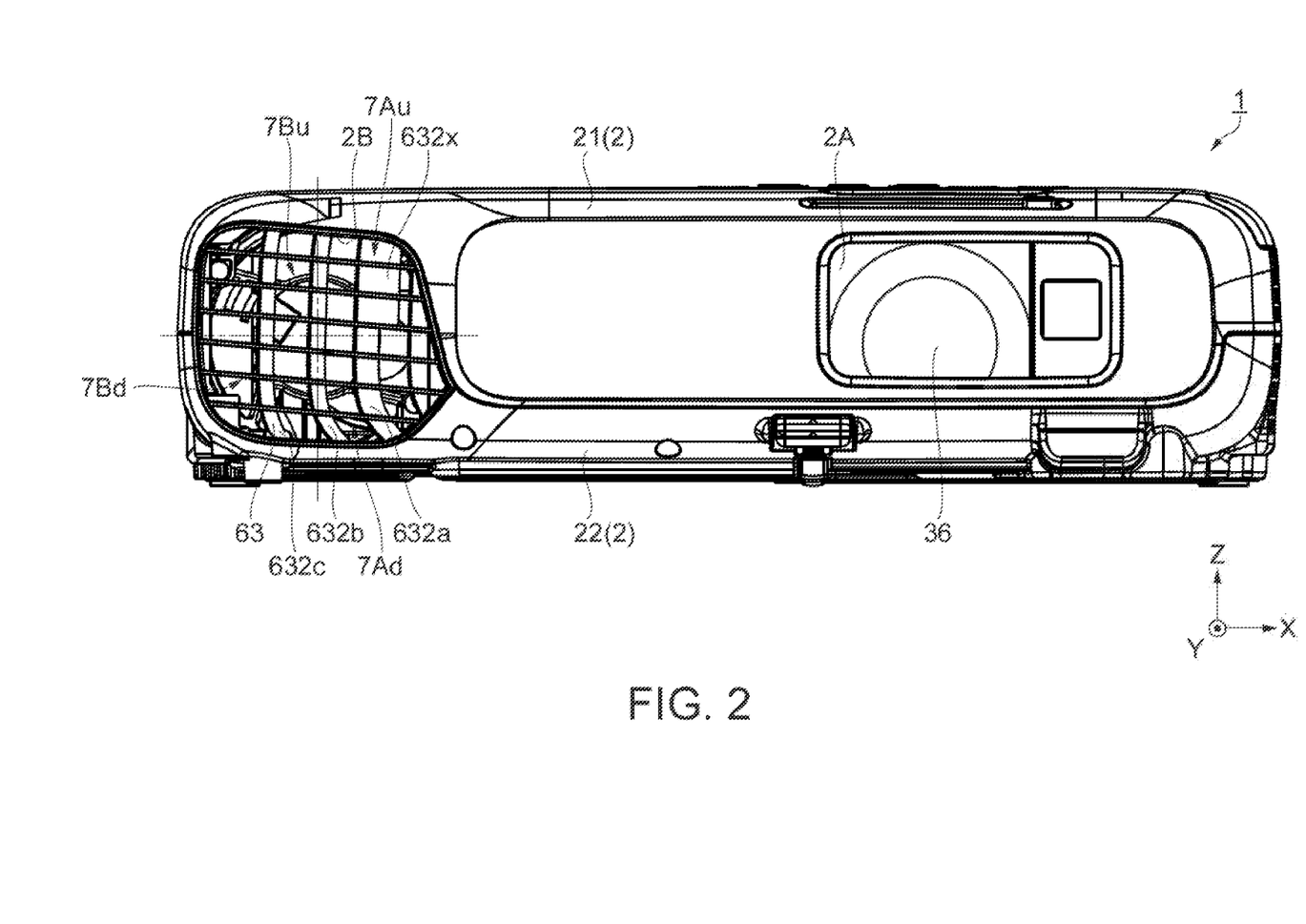
FIG. 2 is an external view of the projector of the embodiment as viewed from the front.

FIG. 2 is an external view of the projector 1 of the embodiment as viewed from the front.

The external housing 2 is made of a synthetic resin and includes, as shown in FIG. 2, an upper case 21 forming an upper portion of the external housing 2 and a lower case 22 forming a lower portion thereof. These cases are fixed to each other with a screw or the like.

As shown in FIG. 2, the tip of the projection lens 36 is exposed in the external housing 2. The external housing 2 is provided with a projection opening 2A through which the luminous flux emitted through the projection lens 36 passes, and an exhaust port 2B through which air inside the external housing 2 is discharged. As shown in FIG. 2, the exhaust port 2B is formed to the left of the projection opening 2A and on the same side as the projection opening 2A. The projection opening 2A and the exhaust port 2B are arranged so as to be along the left-and-right direction (the positive and negative X directions) as a first direction. Although not shown in the drawing, the external housing 2 is provided with a suction port for taking in outside air.

The controller includes a CPU (Central Processing Unit), a ROM (Read Only Memory), and a RAM (Random Access Memory) to function as a computer. The controller performs control of the operation of the projector 1, for example, control relating to the projection of an image.

Configuration of Optical Unit

Under the control of the controller, the optical unit 3 optically processes the luminous flux emitted from the light source device 31 and projects the processed luminous flux.

As shown in FIG. 1, the optical unit 3 includes, in addition to the light source device 31, an integrator illumination optical system 32, a color separating optical system 33, a relay optical system 34, an optical device 4, the projection lens 36, and an optical component housing 38 for arranging these members at predetermined positions on an optical path.

The light source device 31 includes a discharge-type light source 311 composed of an extra-high-pressure mercury lamp, a metal halide lamp, or the like, and a reflector 312. A luminous flux emitted from the light source 311 is reflected by the reflector 312 and emitted toward the integrator illumination optical system 32.

The integrator illumination optical system 32 includes a first lens array 321, a second lens array 322, a polarization converting element 323, and a superimposing lens 324. The integrator illumination optical system 32 is configured such that the luminous flux emitted from the light source device 31 is emitted substantially uniformly on surfaces of liquid crystal light valves 52 described later and is effectively utilized.

The color separating optical system 33 includes two dichroic mirrors 331 and 332 and a reflection mirror 333. The color separating optical system 33 has a function of separating a luminous flux emitted from the integrator illumination optical system 32 into three color lights: a red light (hereinafter referred to as "R-light"), a green light (hereinafter referred to as "G-light"), and a blue light (hereinafter referred to as "B-light").

The relay optical system 34 includes a light incident-side lens 341, a relay lens 343, and reflection mirrors 342 and 344. The relay optical system 34 has a function of guiding the R-light separated by the color separating optical system 33 to the liquid crystal light valve 52 for R-light. Although the optical unit 3 is configured such that the relay optical system. 34 guides the R-light, the embodiment is not limited to this. For example, the relay optical system 34 may guide the B-light.

The optical device 4 includes electro-optic devices 5 disposed for the respective color lights (the electro-optic device for R-light is denoted by 5R; the electro-optic device for G-light is denoted by 5G; and the electro-optic device for B-light is denoted by 5B) and a cross dichroic prism 41 as a color combining optical device.

Each of the electro-optic devices 5 includes a light incident-side polarizer 51, the liquid crystal light valve 52 as a light modulating device (the liquid crystal light valve for R-light is denoted by 52R; the liquid crystal light valve for G-light is denoted by 52G; and the liquid crystal light valve for B-light is denoted by 52B) and a light exiting-side polarizer 54. The electro-optic devices 5 modulate the respective color lights according to image information.

The cross dichroic prism 41 includes four right-angle prisms bonded together, and therefore has a substantially square shape in plan view. At interfaces where the right-angle prisms are bonded together, two dielectric multilayer films are formed. In the cross dichroic prism 41, the dielectric multilayer films reflect the color lights modulated by the electro-optic devices 5R and 5B while transmitting the color light modulated by the electro-optic device 5G, to thereby combine the respective color lights.

The projection lens 36 includes a plurality of lenses (not shown) arranged along an optical axis 36J, and projects in an enlarged manner the light combined by the cross dichroic prism 41 onto a screen.

Configuration of Cooling Device

As shown in FIG. 1, the cooling device 6 is arranged in front (the positive Y direction) of the light source device 31, cools the light source device 31 and the like, and discharges air that cooled the light source device 31 and the like to the outside of the external housing 2.

The cooling device 6 includes an axial-flow fan 61, a duct 62, and a louver 63 arranged at the exhaust port 2B of the external housing 2.

Figure 3:
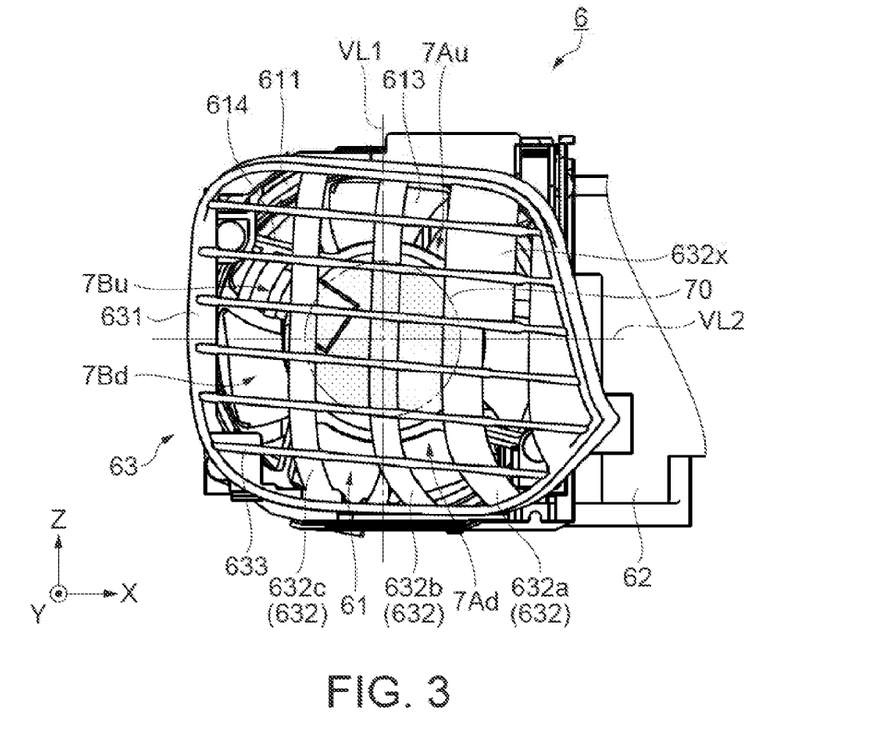
FIG. 3 shows a cooling device of the embodiment as viewed from the front.
Figure 4:
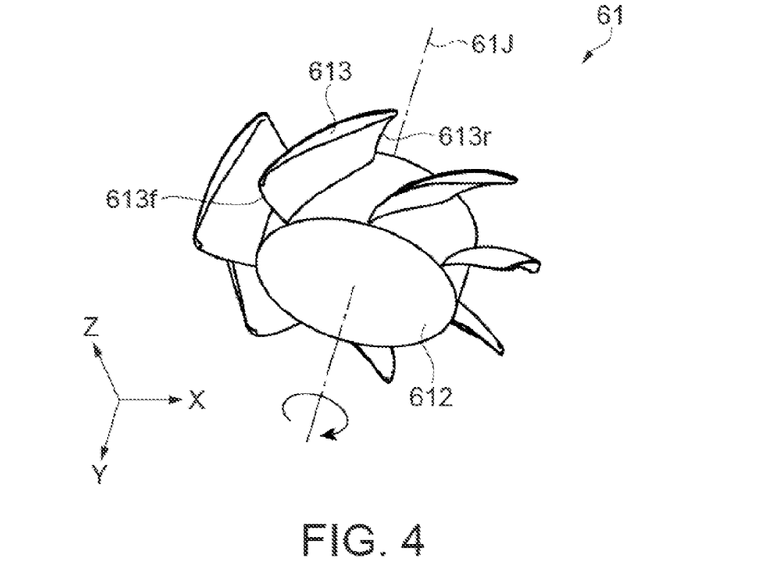
FIG. 4 is a perspective view showing a portion of an axial-flow fan of the embodiment.

FIG. 3 shows the cooling device 6 as viewed from the front (the positive Y direction). FIG. 4 is a perspective view showing a portion of the axial-flow fan 61.

As shown in FIGS. 3 and 4, the axial-flow fan 61 includes a tubular outer frame 611, a rotating shaft 612 having a central axis 61J, a plurality of blades 613 formed at the circumference of the rotating shaft 612 at a predetermined pitch, a support member 614, and a motor (not shown). With the rotation of the blades 613, the axial-flow fan 61 causes air to flow therein in a direction of the central axis 61J and delivers the air flowing therein. The rotating shaft 612 and the blades 613 are integrally formed of, for example, a resin. The support member 614 includes a column-shaped portion and a projecting portion, and is fixed to the outer frame 611. The rotating shaft 612 is rotatably supported by the column-shaped portion of the support member 614.

A rotating shaft of the motor is inserted in the rotating shaft 612. When the motor is driven, the plurality of blades 613 rotate together with the rotating shaft 612.

As shown in FIG. 4, each of the blades 613 is formed so as to extend clockwise from a front-side edge 613*f* toward a rear-side edge 613*r*. When the motor is driven, the blades 613 rotate clockwise as viewed from the front (the positive Y direction), so that the axial-flow fan 61 causes air to flow from the rear-side edge 613*r* side toward the front-side edge 613*f* side inside the outer frame 611, and delivers the air flowing therein to the front (the positive Y direction).

As shown in FIG. 1, the axial-flow fan 61 is arranged between the light source device 31 and the louver 63 such that the central axis 61J lies in the same direction as the optical axis 36J of the projection lens 36, and that the axial-flow fan 61 faces the exhaust port 2B. That is, the axial-flow fan 61 is arranged such that a delivery port through which air is delivered is in a face-to-face relationship with a surface along the projection surface of an image. When the motor is driven, the axial-flow fan 61 causes air to flow therein from the light source device 31 side and delivers the air flowing therein to the louver 63 side.

Figure 5:
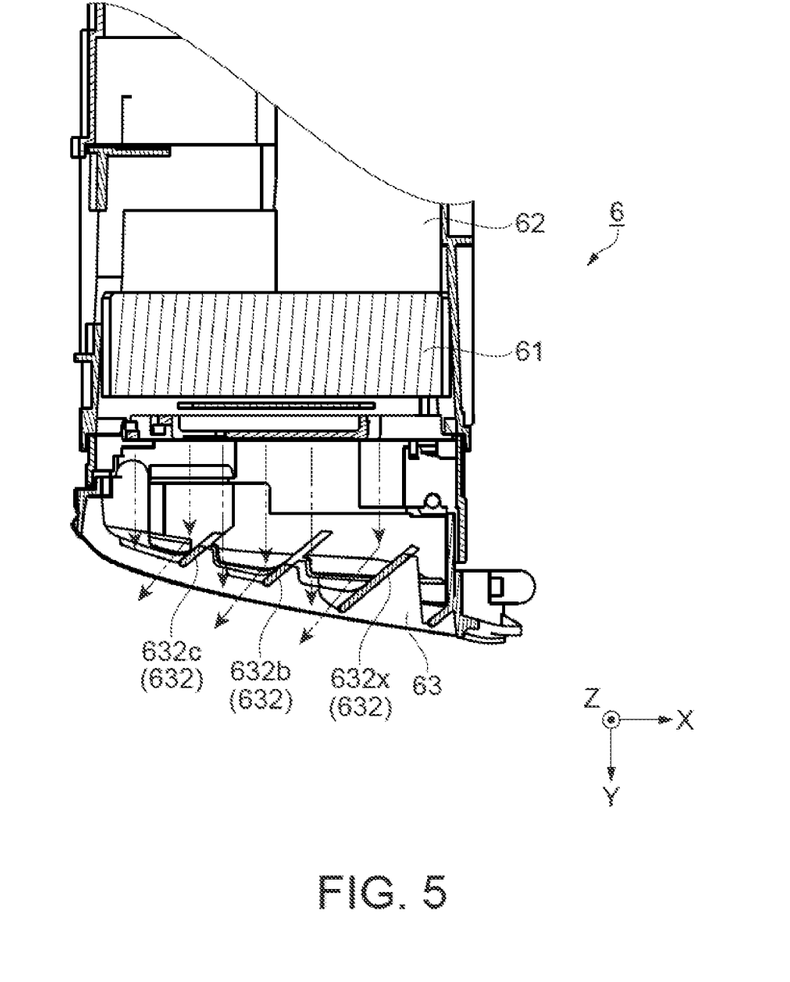
FIG. 5 is a cross-sectional view of the cooling device of the embodiment as viewed from above.

FIG. 5 is a cross-sectional view of the cooling device 6 as viewed from above. In the axial-flow fan 61 of FIG. 5, constituent members such as the blades 613 are omitted.

The duct 62 is formed in a tubular shape, extends from the front of the light source device 31, and is formed so as to surround the axial-flow fan 61 as shown in FIG. 5. The duct 62 has a function of guiding air flowing in the axial-flow fan 61.

Figure 6:
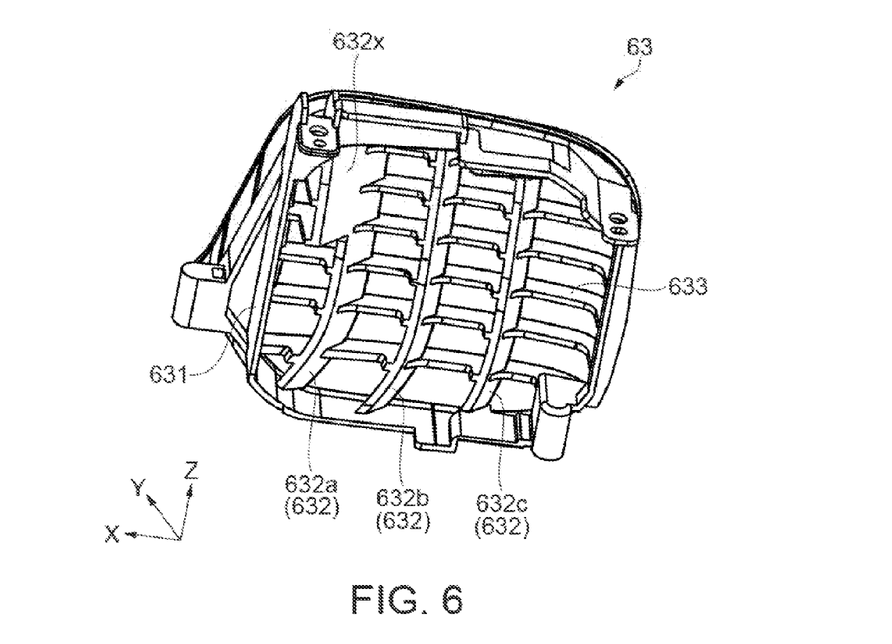
FIG. 6 is a perspective view of a louver of the embodiment as viewed from within an external housing.

FIG. 6 is a perspective view of the louver 63 as viewed from within the external housing 2.

As shown in FIGS. 3 and 6, the louver 63 includes a frame portion 631, slats 632, and reinforcing portions 633.

The size of the frame portion 631 in plan view is larger than that of the outer frame 611 of the axial-flow fan 61. The frame portion 631 is formed so as to be along an edge portion of the exhaust port 2B of the external housing 2.

The plurality of slats 632 are formed inside the frame portion 631 to extend in a direction intersecting the left-and-right direction (the positive and negative X directions, the first direction), that is, in a direction substantially along an up-and-down direction in the embodiment. As shown in FIG. 5, the plurality of slats 632 are inclined with respect to a Y-Z plane such that the front side is located further away from the projection opening 2A (refer to FIG. 2) than the rear side, and guides the air delivered from the axial-flow fan 61 to the outside of the external housing 2.

As shown in FIG. 3, the slats 632 are composed of slats 632a, 632b, and 632c arranged successively from the side close to the projection opening 2A (refer to FIG. 2).

The slats 632a, 632b, and 632c are arranged as described below with respect to four exhaust areas 7Au, 7Ad, 7Bu, and 7Bd arranged side by side in the first direction (the left-and-right direction, the positive and negative X directions) in the exhaust port 2B and a second direction (the up-and-down direction, positive and negative Z directions) orthogonal to the first direction.

First, the exhaust areas 7Au, 7Ad, 7Bu, and 7Bd will be described.

As shown in FIG. 3, the exhaust areas 7Au, 7Ad, 7Bu, and 7Bd are arranged side by side via a first imaginary line VL1 and a second imaginary line VL2 as viewed from a direction (front) in which air is delivered from the axial-flow fan 61. The first imaginary line VL1 crosses an area 70 overlapping the rotating shaft 612 (refer to FIG. 4) of the axial-flow fan 61 and is orthogonal to the first direction (the left-and-right direction), and the second imaginary line VL2 crosses the area 70 and is orthogonal to the second direction (the up-and-down direction). In the embodiment, a line crossing the central axis 61J of the rotating shaft 612 and extending in the up-and-down direction, as viewed from the front, is the first imaginary line VL1, while a line crossing the central axis 61J and extending in the left-and-right direction is the second imaginary line VL2.

Among the plurality of slats 632, the slat 632a closest to the projection opening 2A is formed on the right side of the exhaust areas 7Au, 7Ad, 7Bu, and 7Bd, that is, in the exhaust areas 7Au and 7Ad on the side close to the projection opening 2A. Further, the slat 632a includes an elongated slat 632x that is disposed in the upper exhaust area 7Au of the exhaust areas 7Au and 7Ad located on the right side, and whose length (guide length) in a direction in which air is guided is longer than that of the other slats 632.

As shown in FIGS. 3 and 6, the elongated slat 632x is formed so as to protrude further to the inner side of the external housing 2 than the other slats 632. That is, as shown in FIGS. 3 and 6, the elongated slat 632x is formed to have a step with respect to the slat 632a formed in the exhaust area 7Ad.

As will be described in detail later, the elongated slat 632x is disposed in the exhaust area 7Au so as to correspond to a rotational direction of the axial-flow fan 61. The extending direction of the slats 632 is not limited to the up-and-down direction (the second direction) as long as the direction is a direction intersecting the left-and-right direction (the first direction). The slats 632 may be formed so as to extend in a direction inclined with respect to the left-and-right direction.

As shown in FIG. 3, the slat 632b located to the left (negative X side) of the slat 632a is disposed in the vicinity of the first imaginary line VL1 as viewed from the front.

The slat 632c located to the left (negative X side) of the slat 632b is formed in the exhaust areas 7Bu and 7Bd located on the left side (negative X side) of the exhaust areas 7Au, 7Ad, 7Bu, and 7Bd.

In the exhaust port 2B as described above, the plurality of slats 632a, 632b, and 632c that extend in the direction intersecting the first direction and guide the air delivered from the axial-flow fan 61 to the outside are disposed. Among the four exhaust areas arranged side by side in the first direction (the left-and-right direction) in the exhaust port 2B and the second direction (the up-and-down direction) orthogonal to the first direction, in one of the two exhaust areas on the side close to the projection opening 2A, the elongated slat 632x whose guide length is longer than that of the other slats 632 is disposed corresponding to the rotational direction of the axial-flow fan 61.

As shown in FIGS. 3 and 6, the plurality of reinforcing portions 633 are disposed to extend in a direction substantially along the first direction, and formed in a lattice shape together with the slats 632. As shown in FIG. 6, the length of the reinforcing portion 633 in a front-back direction is shorter than that of the slats 632 except the elongated slat 632x.

Flow of Air Delivered from Axial-Flow Fan

The flow of air delivered from the axial-flow fan 61 will be described.

As shown in FIG. 5, the air delivered from the axial-flow fan 61 is directed to the louver 63, split into air to directly pass between the plurality of slats 632 and air to be guided by the plurality of slats 632, and then discharged to the outside. A portion of the air delivered from the axial-flow fan 61 hits an inner surface of the duct 62 or the frame portion 631 in the louver 63, and is then directed to the louver 63.

Figure 7:
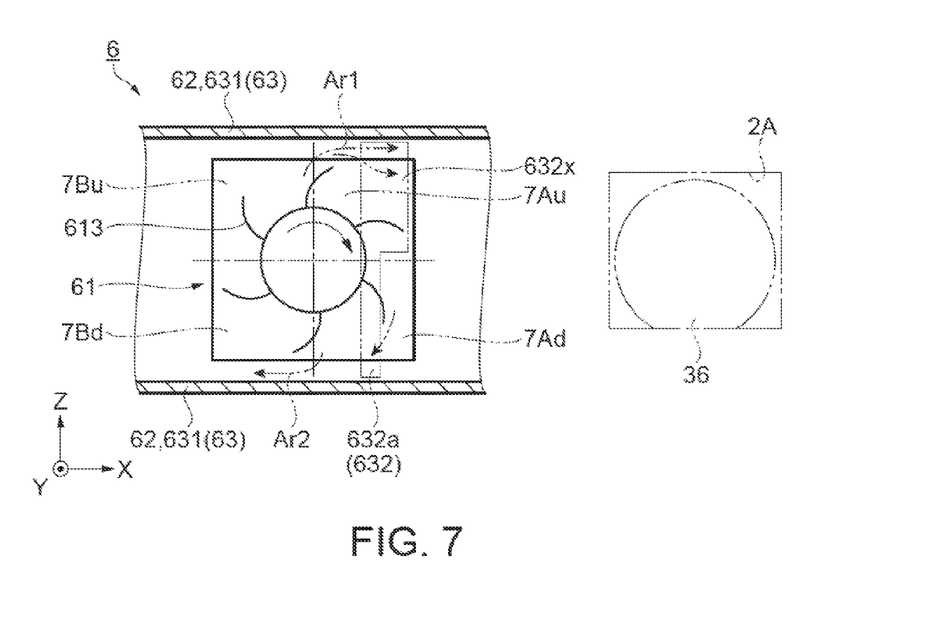
FIG. 7 is a schematic view of a portion of the cooling device in the vicinity of the axial-flow fan in the embodiment as viewed from the front.

FIG. 7 is a schematic view of a portion of the cooling device 6 in the vicinity of the axial-flow fan 61 as viewed from the front. In FIG. 7, the slats 632b and 632c in the louver 63 are omitted to clarify the flow of air.

In the axial-flow fan 61 as described above, the blade 613 rotates clockwise as viewed from the front (the positive Y direction) to deliver the air. That is, the blade 613 rotates so as to come close to the projection opening 2A side in areas corresponding to the exhaust areas 7Au and 7Bu, while rotating so as to move away from the projection opening 2A side in areas corresponding to the exhaust areas 7Ad and 7Bd.

A portion of the air delivered from the axial-flow fan 61 hits the inner surface of the duct 62 or the frame portion 631 as shown in FIG. 7, so that the direction of the flow of the air is changed.

Specifically, a portion of air delivered through the area corresponding to the exhaust area 7Au hits an upper inner surface of the duct 62 or the frame portion 631, and is directed to the louver 63 as air Ar1 that is directed to the positive X direction. Since the elongated slat 632x whose guide length is longer than that of the others is disposed in the exhaust area 7Au, the air Ar1 is guided by the elongated slat 632x and prevented from being directed from the exhaust port 2B to the positive X direction, that is, to the projection opening 2A side.

A portion of air delivered through the area corresponding to the exhaust area 7Bu also hits the upper inner surface of the duct 62 or the frame portion 631, and is directed to the positive X direction. However, since most of the portion of the air is discharged through spaces between the frame portion 631, the slats 632c and 632b, and the elongated slat 632x, the volume of the air directed to the positive X direction is small.

On the other hand, a portion of air delivered through the areas of the delivery port of the axial-flow fan 61 corresponding to the exhaust areas 7Ad and 7Bd hits a lower inner surface of the duct 62 or the frame portion 631, and is directed to the slats 632 as air Art that is directed to the negative X direction, that is, to a direction moving away from the projection opening 2A. The guide length of the slats 632 disposed in the exhaust areas 7Ad and 7Bd is shorter than that of the elongated slat 632x. Therefore, the air Art is prevented from being blocked by the slats 632, thereby being efficiently discharged through the spaces between the plurality of slats 632 to the outside of the external housing 2.

As described above, the elongated slat 632x is disposed in the exhaust area 7Au that is one of the two exhaust areas 7Au and 7Ad on the side close to the projection opening 2A and through which air delivered from the blade 613 that is to rotate so as to come close to the projection opening 2A is mainly discharged. The elongated slat 632x prevents the air, which is delivered through the area where the blade 613 rotates so as to come close to the projection opening 2A side, from being discharged to the projection opening 2A side. The slats 632 other than the elongated slat 632x are formed to have a short guide length so that the air flowing therein is efficiently discharged.

In the embodiment, the elongated slat 632x is disposed in the exhaust area 7Au at the upper right of the exhaust port 2B so as to correspond to the axial-flow fan 61 that rotates clockwise. However, when an axial-flow fan that rotates anticlockwise is used, the elongated slat 632x is formed in the exhaust area 7Ad at the lower right of the exhaust port 2B.

In a configuration in which the exhaust port 2B is located to the right of the projection opening 2A, the elongated slat 632x is disposed in, among four exhaust areas, one of the two exhaust areas on the side close to the projection opening 2A so as to correspond to the rotational direction of the blades 613. That is, when an axial-flow fan that rotates clockwise is used, the elongated slat 632x is disposed in a lower exhaust area of the two exhaust areas on the side close to the projection opening 2A; whereas, when an axial-flow fan that rotates anticlockwise is used, the elongated slat 632x is disposed in an upper exhaust area of the two exhaust areas on the side close to the projection opening 2A.

As has been described above, the following advantageous effects can be obtained according to the embodiment.

(1) The projection opening 2A and the exhaust port 2B are arranged on the same side of the external housing 2 so as to be along the first direction (the left-and-right direction). At the exhaust port 2B, the slats 632 that extend in the direction intersecting the first direction (the left-and-right direction) are disposed. Among the four exhaust areas 7Au, 7Ad, 7Bu, and 7Bd, in one (the exhaust area 7Au) of the two exhaust areas 7Au and 7Ad on the side close to the projection opening 2A, the elongated slat 632x whose length in a direction in which air is guided corresponding to the rotational direction of the axial-flow fan 61 is longer than that of the slats 632 disposed in the other areas is disposed.

With this configuration, it is possible to prevent the ingress of air discharged through the exhaust port 2B into a passing area of the luminous flux projected through the projection lens 36. The air discharged through the exhaust port 2B is warmed air because the air cooled the light source device 31 and the like. Therefore, by preventing the ingress of the air into the passing area of the luminous flux, it is possible to prevent a phenomenon (heat-haze phenomenon) that an image projected onto a screen or the like is distorted. Moreover, the guide length of the slats 632 other than the elongated slat 632x is shorter than that of the elongated slat 632x. Therefore, the slats 632 are formed such that the warmed inside air is efficiently discharged to the outside.

Hence, it is possible to efficiently cool the inside of the projector 1 and project an image in which the heat-haze phenomenon is prevented. Moreover, since efficient discharge is possible, a noise-reduction in the projector 1 can be achieved due to the low-voltage driving of the axial-flow fan 61.

(2) The elongated slat 632x is disposed in the exhaust area 7Au that is one of the two exhaust areas 7Au and 7Ad on the side close to the projection opening 2A and through which the air delivered from the blade 613 that is to rotate so as to come close to the projection opening 2A is mainly discharged. With this configuration, it is possible to change the direction of the air that is likely to be directed to the projection opening 2A side and thereby efficiently prevent the ingress of the air into the passing area of luminous flux.

(3) The elongated slat 632x is formed so as to protrude to the inner side of the external housing 2 with respect to the other slats 632. Therefore, the elongated slat 632x can be arranged at a position closer to the axial-flow fan 61. With this configuration, it is more possible to guide the air delivered from the axial-flow fan 61 such that the air is not directed to the projection opening 2A side. Moreover, since the guide length can be made long without protruding the elongated slat 632x to an outer surface side, the appearance of the projector 1 can be improved. Therefore, it is more possible to prevent the heat-haze phenomenon while improving the design of the projector 1.

(4) The axial-flow fan 61 is arranged such that the delivery port through which air is delivered is in a face-to-face relationship with a surface along the projection surface of an image. With this configuration, compared to a configuration in which the delivery port of the axial-flow fan 61 is not in a face-to-face relationship with the surface along the projection surface and the axial-flow fan 61 is obliquely arranged, the accommodating space of the axial-flow fan 61 in the external housing 2 can be efficiently set. Therefore, it is possible to provide the projector 1 capable of properly cooling the inside by preventing an increase in size, and projecting an image in which the heat-haze phenomenon is prevented.

(5) Since the air delivered from the axial-flow fan 61 can be efficiently guided, the axial-flow fan 61 and the louver 63 can be brought close to each other. With this configuration, a space between the axial-flow fan 61 and the louver 63 can be saved, so that the projector 1 can be reduced in size.

(6) The axial-flow fan 61 is arranged so as to face the exhaust port 2B. The exhaust areas 7Au, 7Ad, 7Bu, and 7Bd are arranged side by side via the first imaginary line VL1 that crosses the area 70 overlapping the rotating shaft 612, and the second imaginary line VL2, as viewed from the direction in which air is delivered from the axial-flow fan 61. With this configuration, the positions for arranging the plurality of slats 632 including the elongated slat 632x can be easily set corresponding to the rotational direction of the blade 613.

MODIFIED EXAMPLE

The embodiment may be modified as follows.

Although, in the embodiment, the three slats 632 (the slats 632a, 632b, and 632c) are disposed, the number of slats may be other than three. Moreover, the plurality of slats 632 may be disposed in the same exhaust area. In the exhaust area where the elongated slat 632x is disposed, the slat 632 whose guide length is shorter than that of the elongated slat 632x may be disposed on the side closer to the projection opening 2A than the elongated slat 632x.

The projector 1 of the embodiment is configured such that the projection opening 2A and the exhaust port 2B are located along the left-and-right direction as the first direction. However, the projector may be configured such that the projection opening and the exhaust port are located along the up-and-down direction or a direction inclined with respect to the left-and-right direction. In the case of this configuration, the up-and-down direction or the inclined direction is the first direction, and a direction orthogonal to the first direction is the second direction.

Although, in the projector 1 of the embodiment, the transmissive liquid crystal light valve 52 is used as a light modulating device, a reflective liquid crystal light valve may be used. Moreover, a device or the like using a micromirror array may be used as a light modulating device.

The light source 311 is not limited to a discharge-type lamp, and may be composed of another type of lamp or a solid-state light source such as a light-emitting diode.

The entire disclosure of Japanese Patent Application No. 2013-009021, filed Jan. 22, 2013 is expressly incorporated by reference herein.

What is claimed is:

1. A projector that modulates, according to image information, a luminous flux emitted from a light source, and projects the modulated luminous flux through a projection lens, comprising:
   an external housing that accommodates the light source and the projection lens, and includes a projection opening through which the luminous flux projected through the projection lens passes, and an exhaust port arranged on a same side as the projection opening and through which inside air is discharged to an outside;
   an axial-flow fan that includes a rotating shaft and blades arranged around the rotating shaft, causes air to flow therein in a direction of a central axis of the rotating shaft with the rotation of the blades, and delivers the air flowing therein;
   a plurality of slats that are arranged at the exhaust port to extend in a direction intersecting a first direction in which the projection opening and the exhaust port are arranged, and guide the air delivered from the axial-flow fan to the outside; and
   a frame portion formed outside the plurality of slats, wherein
      the exhaust port includes four exhaust areas arranged around the central axis of the rotating shaft with a first upper exhaust area and a first lower exhaust area arranged in the first direction on a side of the central axis of the rotating shaft nearest the projection opening and a second upper exhaust area and a second lower exhaust area arranged in the first direction on a side of the central axis of the rotating shaft opposite to the projection opening,
      the first upper exhaust area and the second upper exhaust area are arranged in a second direction orthogonal to the first direction on an upper side of the central axis of the rotating shaft,
      the first lower exhaust area and the second lower exhaust area are arranged in the second direction on a lower side of the central axis of the rotating shaft,
      the plurality of slats include an elongated slat that is disposed in the first upper exhaust area and the first lower exhaust area,
      the elongated slat has a first length, in a direction in which the air delivered from the axial-flow fan is guided to the outside so as to correspond to a rotational direction of the blade, that is longer on one of the upper side and the lower side of the central axis than a second length on the other of the upper side and the lower side of the central axis,
      the first length of the elongated slat is disposed in the exhaust area, that is one of the first upper exhaust area and the first lower exhaust area, through which air, delivered from the blade that is to rotate so as to come close to the projection opening, is mainly discharged, and
      the frame portion is disposed in the first upper exhaust area and the first lower exhaust area.

2. The projector according to claim 1, wherein the elongated slat is formed so as to protrude to an inner side of the external housing with respect to the other slats.

3. The projector according to claim 1, wherein the axial-flow fan is arranged such that the central axis of the rotating shaft lies in the same direction as an optical axis of the projection lens.

4. The projector according to claim 1, wherein the axial-flow fan is arranged so as to face the exhaust port, and
the four exhaust areas are arranged side by side via a first line that crosses an area overlapping the rotating shaft and is orthogonal to the first direction and a second line that crosses the area overlapping the rotating shaft and is orthogonal to the second direction, as viewed from a direction in which air is delivered from the axial-flow fan.

5. The projector according to claim 1, wherein the axial-flow fan is arranged so as to face the exhaust port.

6. The projector according to claim 1, wherein all of the first upper exhaust area and all of the second upper exhaust area are disposed on the upper side of the central axis of the rotating shaft.

7. The projector according to claim 1, wherein
the first upper exhaust area and the second upper exhaust area are disposed between the central axis and a first side of the external housing,
the first lower exhaust area and the second lower exhaust area are disposed between the central axis and a second side of the external housing opposite to the first side,
the first upper exhaust area and the first lower exhaust area are disposed between the central axis and a third side of the external housing,
the second upper exhaust area and the second lower exhaust area are disposed between the central axis and a fourth side of the external housing opposite to the third side, and
all of the first upper exhaust area is disposed between the central axis and the first side, and between the central axis and the third side.

* * * * *